Oct. 21, 1969  R. L. PEEK, JR  3,474,205
DAMPING SPRING FOR SELECT BARS IN CROSSBAR SWITCHES
Filed Dec. 8, 1967  3 Sheets-Sheet 1

INVENTOR
ROBERT L. PEEK JR. DECEASED
BY CHARLES W. CRAWFORD, EXECUTOR
BY Curphey + Erickson
PATENT AGENTS

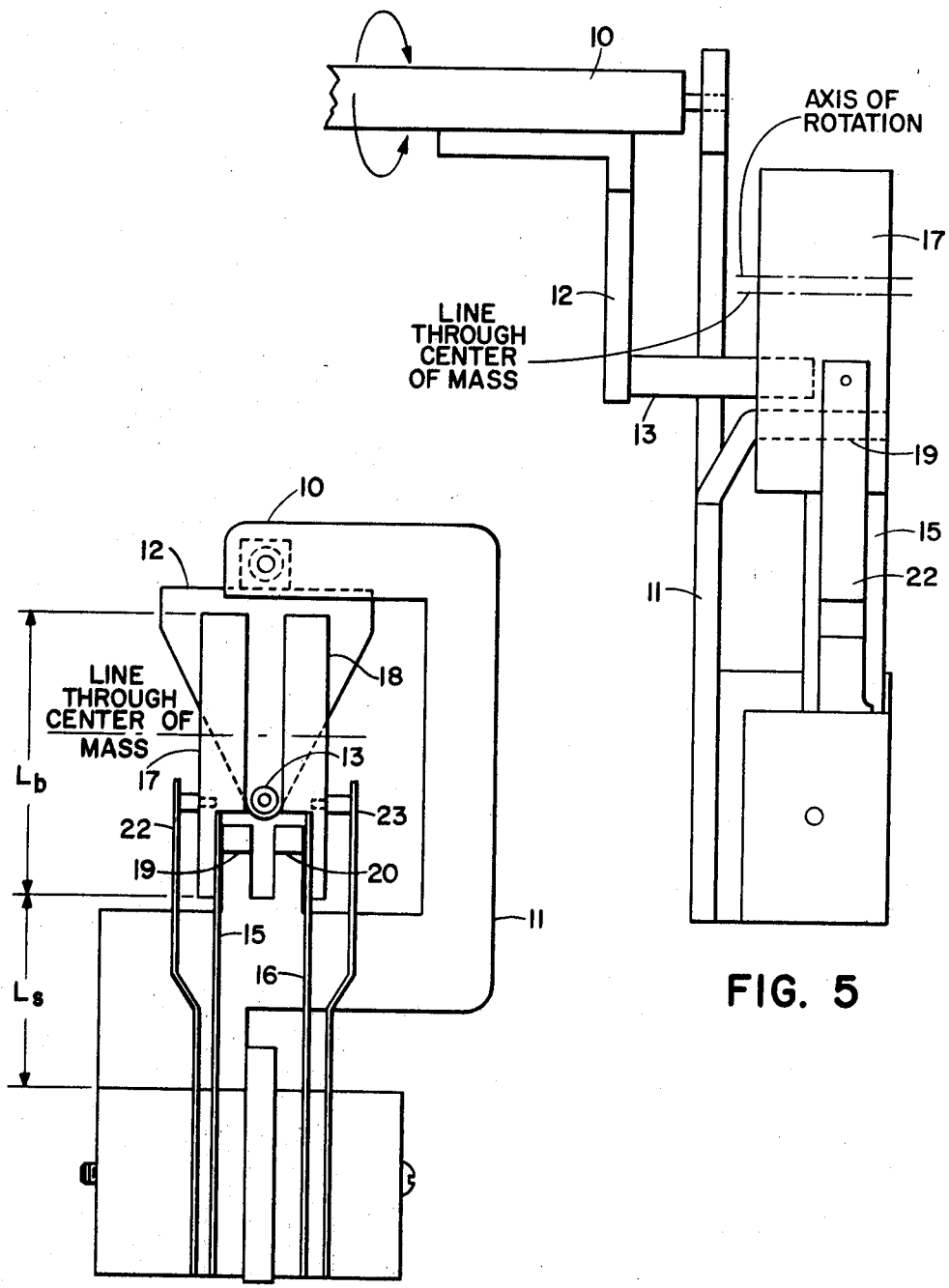

Oct. 21, 1969    R. L. PEEK, JR    3,474,205
DAMPING SPRING FOR SELECT BARS IN CROSSBAR SWITCHES
Filed Dec. 8, 1967    3 Sheets-Sheet 3

INVENTOR
ROBERT L. PEEK JR., DECEASED
BY CHARLES W. CRAWFORD, EXECUTOR

BY Curphey & Erickson
PATENT AGENTS

United States Patent Office 3,474,205
Patented Oct. 21, 1969

3,474,205
DAMPING SPRING FOR SELECT BARS
IN CROSSBAR SWITCHES
Robert Lee Peek, Jr., deceased, late of Smithtown, N.Y.,
by Charles W. Crawford, executor, New York, N.Y., assignor to Northern Electric Company Limited, Montreal, Quebec, Canada
Filed Dec. 8, 1967, Ser. No. 690,050
Int. Cl. H01h 3/60
U.S. Cl. 200—166                          10 Claims

ABSTRACT OF THE DISCLOSURE

An improved damping and restoring spring assembly used in a crossbar switch for restoring a select bar to its neutral position. The spring assembly comprises a pair of cantilevered springs mounted on opposite sides of a restoring arm on the select bar. Each of the springs has relatively massive damping weights which contact the restoring arm at a point substantially displaced from their mass centre. This imparts a rotational moment to the weights during impact which excites both a primary and secondary mode of vibration in the springs, so as to dampen the motion of the select bar in an efficient manner.

---

This invention relates to an improved damping and restoring spring used in a crossbar switch for restoring a select bar to its neutral position, and more particularly to means for exciting a plurality of vibratory modes in the spring in order to rapidly dissipate the energy therein and thereby dampen the oscillations of the select bar in an efficient manner.

In the operation of a crossbar switch, a select bar having a plurality of select fingers, is rotated about its longitudinal axis in either of two directions, upon energization of one of a pair of electromagnets. The select fingers, in turn, pre-set the crossbar switch so that upon actuation of a hold magnet associated with a particular select finger, a set of contacts will be actuated in order to complete a circuit through the switch. Upon release of the energized electromagnet, the select bar is returned to its neutral position by one or more restoring springs associated therewith.

One common arrangement utilizes a pair of cantilevered springs disposed to urge against opposite sides of a restoring arm on the select bar. However, the inertia imparted to the select bar during the initial restoring interval causes it to overshoot the neutral position thus resulting in a series of damped oscillations. If this overshoot is sufficient, actuation of a second hold magnet at the wrong instant could result in erroneous operation of another set of contacts.

In an attempt to arrest this vibratory action, a damping weight has been affixed to the free end of the springs. The restoring arm is disposed to contact each of the weights at about their mass centre. Because of the inertia required to deflect the weights, the overshoot is reduced. However, in order to be effective, the mass of the weights must be relatively large in comparison to that of the select bar and its associated fingers. Since the inertia of one of the weights must be overcome during the initial deflection of the select bar, a relatively large electromagnetic force is required for rapid operation of the switch. Additionally, in order to obtain rapid return of the select bar, the tension of the cantilevered springs must also be increased, thereby decreasing the damping efficiency. With prior systems this results in a trade-off between operating time of the crossbar switch, size of the components used and reliability of operation. Thus, the above-described restoring and damping springs are unsatisfactory for a modern crossbar system which requires rapid operation of the crossbar switch, together with reduced size and high reliability.

In order to reduce the size of the electromagnets in the switch, a significant reduction in the mass of the damping weights must also be made together with a reduction in the stiffness of the cantilevered springs without diminishing the speed of operation or the reliability.

It has ben discovered that such a significant reduction in the mass of the damping weights can be achieved while retaining the overall damping efficiency, by positioning the cantilevered springs so that the restoring arm on the select bar contacts each of the damping weights at a point substantially displaced from their mass centre, and between that centre and the fixed ends of the associated springs. This imparts a rotational moment to the damping weight during impact which excites both a primary or low frequency mode in the spring in which its deflection is all in one direction, and a secondary or high frequency mode in which the spring has a reverse curvature. In the primary mode, each damping weight rotates about a point on its prolonged axis between its mass centre and the fixed end of the associated spring as in the prior systems. In the secondary mode, however, each weight rotates about a point on its axis close to and beyond its mass centre. The excitation of this additional high frequency mode results in a significant reduction in the amplitude of vibration of each cantilevered spring and in the follow-through of the select bar.

In one embodiment of the invention, the length of the damping weight along the longitudinal axis of the cantilevered spring is made longer than the free length of the spring. By placing the point of contact between the restoring arm and the weight as close as possible to the fixed end of the cantilevered spring, a rotational moment close to the mass centre of the weight is achieved.

To position the select bar in its neutral position and to prevent follow-through of each of the cantilevered springs and weights beyond the neutral position, a stop means located between the two weights is also provided. The stop means is positioned to contact each of the weights at a point adjacent to that of the restoring arm. In a preferred embodiment, the stop means comprises a pair of studs, each of which is disposed to contact only one of the damping weights. This helps to reduce the transfer of energy from one damping weight through the stop means to the other damping weight. In addition, the studs are positioned so that the returning weight contacts one stud before the restoring arm strikes the other damping weight, thus preventing the transfer of kinetic energy from one weight through the arm to the other weight. Through repeated impacts between the weights, and the restoring arm and studs, rapid and efficient dissipation of the initial energy is effected.

An example embodiment of the invention will now be described with reference to the accompanying drawings in which:

FIG. 2 is a front elevational view of the switch illustrated in FIG. 1 with the select bar shown in an inoperative position;

FIG. 5 is a side elevational view of the crossbar switch illustrated in FIG. 1, and is located on the same sheet as FIG. 2.

Figure 1:
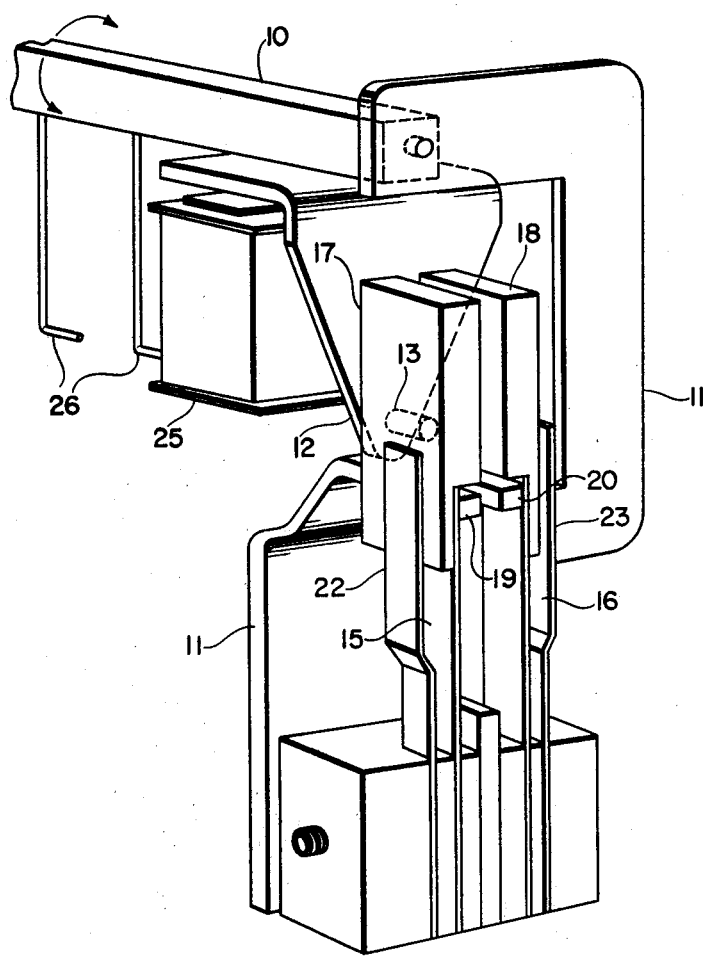
FIG. 1 is a fragmentary perspective view of a crossbar switch illustrating an improved damping means for a select bar in accordance with the present invention.

Referring to FIGS. 1 to 5, there is illustrated a select bar 10 rotatably mounted along its longitudinal axis on a frame 11 of the crossbar switch. Affixed to the select bar 10 is a restoring arm 12, which also functions as an armature. The arm 12 has an actuating pin 13 displaced orthogonally from the longitudinal axis of the select bar 10. As shown, the pin 13 has a hand rubber sleeve to effect good damping.

A pair of cantilevered springs 15 and 16, are mounted on the frame 11 on opposite sides of the actuating pin 13. Each of the cantilevered springs 15 and 16 has a relatively massive rigid damping weight in the form of elongated bars 17 and 18 respectively affixed to the free ends thereof. In the inoperative or neutral position, the elongated bars 17 and 18 are tensioned against a stop means comprising a pair of studs 19 and 20 respectively which form part of the frame 11. A pair of tensioning springs 22 and 23, mounted on the frame 11, are disposed to bear against the elongated bars 17 and 18 respectively.

As shown in FIG. 2, the length $L_b$ of the elongated bars 17 and 18 is greater than the free length $L_s$ of the springs 15 and 16. In addition, both the actuating pin 13 of the restoring arm 12, and the studs 19 and 20 are positioned to contact the elongated bars 17 and 18 between their centre of mass and the fixed ends of the cantilevered springs 15 and 16 at points substantially displaced from the mass centre.

Figure 3:
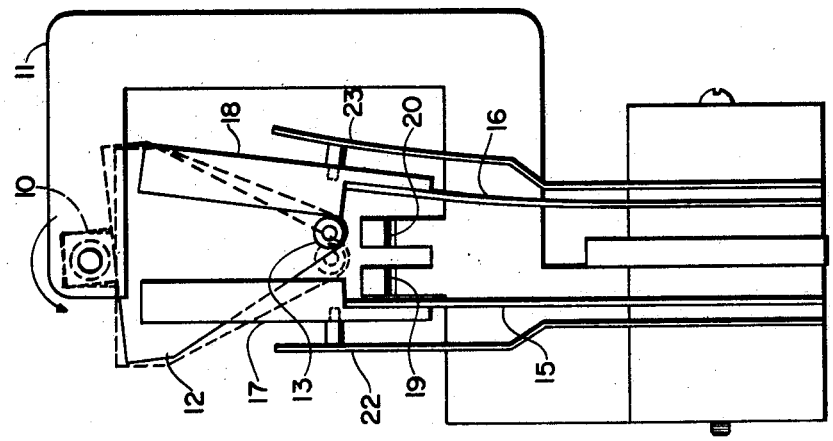
FIG. 3 is a front elevational view of the switch illustrated in FIG. 1 with the select bar shown in an operated position.

Referring now to FIGS. 1 to 3, in operation, energization of a select bar magnet 25 attracts the armature portion of the restoring arm 12 which causes the select bar 10 to rotate counter-clockwise from its inoperative position (FIG. 2) to an operated position (FIG. 3). This action carries with it a plurality of select fingers in a well-known manner, two of which are shown as 26 in FIG. 1. Rotation of the select bar 10 to the operated position causes the actuating pin 13 to bear against the elongated bar 18 and deflect both the cantilevered spring 16 and the tensioning spring 23 about their fixed ends (FIG 3).

Figure 4:
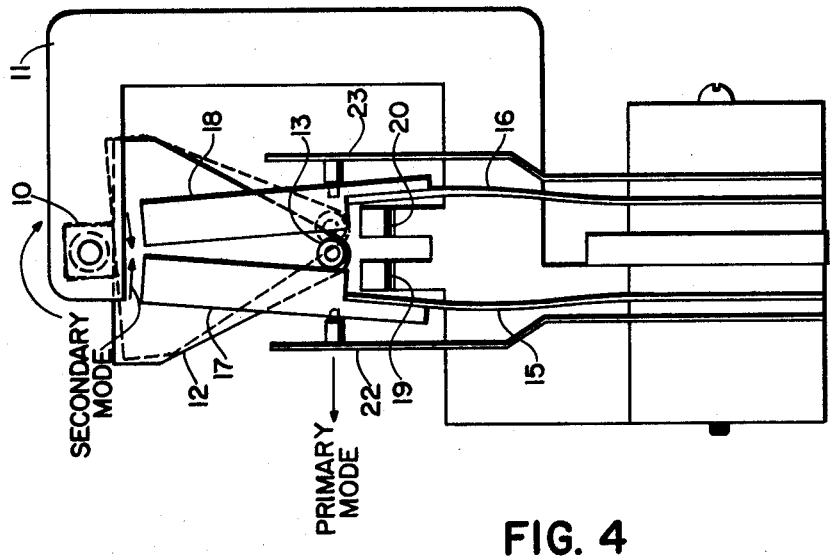
FIG. 4 is a front elevational view of the switch illustrated in FIG. 1, showing the select bar in a transient state during return to its inoperative position.

Upon release of the select bar magnet 25, the pretensioned springs 16 and 23, urging against the actuating pin 13, commence to return the select bar 10 to its neutral position. As the actuating pin 13 reaches the neutral or inoperative position, the inner end of the elongated bar 18 strikes the stud 20. The impact causes rotation of the bar 18 about an axis conjugate to the point of impact relative to its mass center. This causes a reverse curvature of the cantilevered spring 16 as shown in FIG. 4, thereby exciting a secondary or high frequency mode in it. Concurrently, the inertia of the bar 18 striking the stud 20 causes it to rebound thereby exciting a primary or low frequency mode in the cantilevered spring 16 such that the bar 18 rotates about a point on its prolonged axis below its mass centre.

Due to the inertia of the select bar 10 and the restoring arm 12, the actuating pin 13 follows through beyond the neutral position and strikes the elongated bar 17. As illustrated in FIGURE 4, this impact causes an overall deflection to the left of the elongated bar 17 and the spring 15 thus exciting the simple or primary mode in the spring 15. In addition, because the actuating pin 13 strikes the elongated bar well below its mass centre, a rotational moment is imparted to the bar 17, thereby exciting the secondary mode. Hence, both modes are excited in the cantilevered springs 15 and 16 by each impact between them and either the actuating pin 13 or the studs 19 or 20.

The amplitude of the secondary or high frequency mode can be maximized while that of the primary or low frequncy mode minimized by making the point of impact between the bars 17 and 18, and the actuating pin 13 or the studs 19 and 20, as near the lower ends of the bars 17 and 18 as possible. In addition, if the free length of the cantilevered springs 15 or 16 is small relative to the length of the bars 17 or 18, the axis of rotation for the secondary mode approaches the mass centre of the bars 17 and 18 as shown in FIGURE 5.

As illustrated in FIG. 2, when the select bar 10 is in its neutral position, the springs 15 and 16 are tensioned against the studs 19 and 20 respectively. This maintains the actuating pin 13 spaced from the bars 17 and 18, which prevents the transfer of kinetic energy from the elongated bar 18 through the actuating pin 13 to the elongated bar 17 during the initial return of the select bar 10 and thereafter during subsequent impacts.

In addition, by utilizing two separate studs 19 and 20 for the stop means rather than a single stud, a significant reduction in the transfer of kinetic energy from the elongated bar 18 through the stop means to the elongated bar 17 is achieved. In order to accommodate the two studs 19 and 20 in the limited space available, it was necessary to modify the uniform dimensions of the bars as shown in FIG. 2. As a result, the bars 17 and 18 do not make contact directly with the studs 19 and 20, but make contact through the upper ends of the springs 15 and 16. However, because the springs 15 and 16 are rigidly affixed to the bars 17 and 18 in this area, effective contact between the bars 17 and 18 and the studs 19 and 20 is effected.

In the illustrated embodiment, each of the springs 15, 16, 22 and 23 is a single leaf spring. The use of the tensioning springs 22 and 23 is not absolutely necessary to the invention. However, they provide a ready means for controlling the amount of pressure which is exerted on the studs 19 and 20 when the select bar 10 is in its neutral position. This, in turn, controls the velocity with which the bars 17 and 18 strike the studs 19 and 20, and the momentum imparted to the select bar 10 once the select bar magnet 25 is released.

The energy transferred to the secondary or high frequency mode will be maximized if the actuating pin 13 is in the same plane as the studs 19 and 20. As these two locations are necessarily different, the pin 13 and the studs 19 and 20 are placed as close as possible together. Preferably, the actuating pin 13 should be between the studs 19 and 20 and the fixed ends of the cantilevered springs 15 and 16. However, because this would further complicate the construction and assembly of the crossbar switch, the arrangement illustrated in the example embodiment was chosen.

The above describes the initial motion of the select bar 10, together with its restoring arm 12, the cantilevered springs 15 and 16 and the elongated bars 17 and 18 after the release of the select bar magnet 25. After one or more impacts between the elongated bar 17 and the actuating pin 13, the select bar 10 is urged by the bar 17 and springs 15 and 22 to rotate in a counter-clockwise direction where its motion is again limited by impact with the elongated bar 18. After a series of impacts between the two bars 17 and 18 and the actuating pin 13, the select bar 10 is brought to rest in its neutral position.

Each impact between the actuating pin 13 and the elongated bars 17 or 18 transfers and dissipates energy. Some of the transferred energy is diverted to the primary or secondary modes where it is ultimately dissipated by internal friction and air damping. Similarly, energy is transferred between the elongated bars 17 or 18 and the studs 19 or 20. In addition, some frictional losses occur between the points at which the tensioning springs 22 and 23 contact the cantilevered springs 15 and 16.

Thus, one of the factors affecting the time required to return the select bar 10 to its neutral position is the speed and number of impacts. By exciting the secondary or high frequency mode as well as the primary mode, the total number of impacts in a given period may be increased, thereby effecting efficient damping. As a result of positioning the actuating pin 13 and the studs 19 and 20 so that both modes are excited in the cantilevered springs 15 and 16 during impact, the mass of the bars 17 or 18 can be substantially reduced without impairing the reliability of the damping means. This in turn permits smaller select bar magnets and tensioning springs to be utilized thereby further decreasing the overall size, weight and cost of the crossbar switch.

What is claimed is:
1. In a crossbar switch comprising:
 (a) a frame;
 (b) a select bar rotatably mounted on said frame, said select bar being rotatable about an axis in either direction from a neutral position;
 (c) the select bar including a restoring arm having an orthogonal component relative to said axis;
 (d) a pair of cantilevered springs affixed to said frame and positioned on opposite sides of the restoring arm; one or the other of said cantilevered springs being disposed to coact with the restoring arm so as to urge the select bar towards said neutral position, when the select bar is rotated in one or the other of said directions respectively;
 (e) each of the cantilevered springs having a relatively massive rigid weight at the free end thereof;
 (f) stop means affixed to the frame and positioned between the cantilevered springs, each of the cantilevered springs being contiguous with said stop means when the select bar is in the neutral position;
 (g) the improvement comprising;
 both the restoring arm and the stop means being positioned to contact each of the relatively massive rigid weights at points between the centre of mass of each of said weights and the respective fixed ends of the cantilevered springs, so as to impart a substantial rotational moment to said weights during impact therebetween, thereby to excite primary and secondary modes of vibration in said cantilevered springs.

2. A crossbar switch as defined in claim 1 in which each of the relatively massive rigid weights comprises;
 an elongated bar affixed lengthwise to each of the cantilevered springs, the length of each of said elongated bars being greater than the free length of the cantilevered springs.

3. A crossbar switch as defined in claim 2 in which the stop means and the restoring arm contact each of the elongated bars adjacent the ends thereof nearest the fixed ends of said springs, whereby the rotational moment is about an axis adjacent said centre of mass.

4. A crossbar switch as defined in claim 3 in which each of the cantilevered springs has a tensioning spring associated therewith, said tensioning springs being adapted to urge each of the respective cantilevered springs against the restoring arm.

5. A crossbar switch as defined in claim 4 in which the select bar rotates about the longitudinal axis thereof.

6. A crossbar switch as defined in claim 5 in which each of the cantilevered springs and the tensioning springs is a leaf spring.

7. A crossbar switch as defined in claim 6 in which said stop means comprises:
 a pair of studs, each of said studs being disposed to contact only one of said cantilevered springs.

8. A crossbar switch as defined in claim 7 in which each of said cantilevered springs is tensioned against the respective stud and the restoring arm is spaced from said weights when the select bar is in the neutral position.

9. A crossbar switch as defined in claim 1 in which said stop means comprises:
 a pair of studs, each of said studs being disposed to contact only one of said cantilevered springs.

10. A crossbar switch as defined in claim 9 in which each of said cantilevered springs is tensioned against the respective stud and the restoring arm is spaced from said weights when the select bar is in the neutral position.

References Cited

UNITED STATES PATENTS

| | | |
|---|---|---|
| 2,785,248 | 3/1957 | White. |
| 2,789,177 | 4/1957 | Brockway. |
| 3,257,781 | 9/1966 | Highley et al. |

HERMAN O. JONES, Primary Examiner

U.S. Cl. X.R.

200—175